(12) United States Patent
De Wilde et al.

(10) Patent No.: US 7,396,235 B2
(45) Date of Patent: Jul. 8, 2008

(54) MODULAR ELECTRONIC DEVICE

(75) Inventors: Jim Sven Anthony De Wilde, Lisse (NL); Tom Marnix Alexander De Wilde, Lisse (NL)

(73) Assignee: Stichting Noble House, Lisse (NL)

( * ) Notice: Subject to any disclaimer, the term of this patent is extended or adjusted under 35 U.S.C. 154(b) by 305 days.

(21) Appl. No.: 10/509,168

(22) PCT Filed: Mar. 25, 2003

(86) PCT No.: PCT/NL03/00224

§ 371 (c)(1),
(2), (4) Date: Oct. 31, 2005

(87) PCT Pub. No.: WO03/080396

PCT Pub. Date: Oct. 2, 2003

(65) Prior Publication Data

US 2006/0057984 A1    Mar. 16, 2006

(30) Foreign Application Priority Data

Mar. 27, 2002   (NL) .................................. 1020262

(51) Int. Cl.
*H01R 11/30* (2006.01)
(52) U.S. Cl. .................. 439/39; 439/309; 248/316.4
(58) Field of Classification Search ............ 439/39–40, 439/308–309; 248/316.4
See application file for complete search history.

(56) References Cited

U.S. PATENT DOCUMENTS

| 4,319,097 A | 3/1982 | Liautaud |
| 5,349,326 A | 9/1994 | Yamada |
| 5,381,684 A | 1/1995 | Kawamura |
| 5,931,683 A * | 8/1999 | Pinel ............................ 439/39 |
| 6,076,790 A | 6/2000 | Richter |
| 6,095,470 A * | 8/2000 | Kalis ......................... 248/309.1 |
| 6,966,533 B1 * | 11/2005 | Kalis et al. ............... 248/316.4 |
| 2004/0188576 A1 * | 9/2004 | Carnevali ................. 248/206.5 |
| 2004/0232291 A1 * | 11/2004 | Carnevali ................. 248/206.5 |

FOREIGN PATENT DOCUMENTS

| DE | 41 07 995 | 9/1992 |
| DE | 298 02 205 | 4/1998 |
| DE | 198 41 847 | 11/1999 |
| EP | 0 317 707 | 5/1989 |
| GB | 2 285 551 | 7/1995 |
| WO | WO 98 17503 | 4/1998 |
| WO | WO 98 39852 | 9/1998 |

* cited by examiner

*Primary Examiner*—Truc T Nguyen
(74) *Attorney, Agent, or Firm*—The Webb Law Firm

(57) ABSTRACT

A module electronic device, for example a car radio, a navigation system or a radar detection system, comprising a fixed module fitted with external electrical contact elements, which is to be mounted on a wall, for example a dashboard, and a detachable module fitted with electronic components and external electrical contact elements, which detachable module can be connected to the fixed module in such a manner that the external electrical contact elements of the two modules are interconnected, wherein the fixed module and/or the detachable module comprise(s) at least one magnet, such that the detachable module can be connected to the fixed module through magnetic force.

5 Claims, 1 Drawing Sheet

MODULAR ELECTRONIC DEVICE

BACKGROUND OF THE INVENTION

The invention relates to a modular electronic device, for example a car radio, a navigation system or a radar detection system, comprising a fixed module fitted with external electrical contact elements, which is to be mounted on a wall, for example a dashboard, and a detachable module fitted with electronic components and external electrical contact elements, which detachable module can be connected to the fixed module in such a manner that the external electrical contact elements of the two modules are interconnected.

Such a device is known. Especially in the case of car radios this modular structure is frequently used, the advantage being the fact that the car radio does not work without the detachable module (the front panel), which makes it less interesting for thieves if the user takes the front panel with him upon leaving the car. An important aspect of such modular systems is the electrical connection between the two modules, which must be reliable in spite of the fact that one module is detachable. One drawback of the existing device, in which the connection between the two modules is effected and locked by mechanical means, is the fact that a relatively large force must be exerted on the detachable module, or that it takes a relatively complex operation to disconnect said module.

SUMMARY OF THE INVENTION

The object of the invention is to provide an inexpensive and efficient modular electronic device, in which the detachable module is easy to connect and disconnect, and in which furthermore a reliable mechanical and electrical connection between the two modules is effected.

In order to accomplish that objective, the fixed module and/or the detachable module comprise(s) at least one magnet, such that the detachable module can be connected to the fixed module through magnetic force. It has become apparent that this makes it very easy to connect the detachable module, in which the detachable module only needs to be held near the fixed module, whereupon the magnetic attraction will provide a sufficiently firm connection between the two modules. The detachable module can be detached in a simple manner by pulling at said module, with no mechanical unlocking being required.

Preferably, the fixed module comprises the magnet, and the detachable module comprises a metal element that can be attracted by the magnet. Since magnets are relatively heavy, it is preferable to accommodate it in the fixed module, so that the user does not have to carry it along.

Preferably, the detachable module comprises a display screen, and furthermore preferably it comprises inputting keys for operating the device.

Preferably, the fixed module and the detachable module comprise mating guide surfaces, which guide the detachable module to the correct position upon connection thereof to the fixed module. This excludes the risk of incorrect positioning of the two modules with respect to each other upon connection, which is in particular important with a view to obtaining a correct connection between the electrical contact elements. The guide surfaces may be made up of a substantially frusto-conical or frusto-pyramidal projection in one module and a corresponding substantially frusto-conical or frusto-pyramidal recess in the other module, for example, in which case the projection is inserted into the recess upon connection.

Preferably, the external electrical contact elements of the fixed module and/or the detachable module are positioned in such a manner that they will automatically come into contact with each other upon connection. What is meant by this is that the electrical contact does not need to be effected by means of a separate operation. Preferably, the external electrical contact elements of the fixed module are elastic, to such an extent that they are elastically deformed upon connection. As a result, a reliable electrical connection will be maintained.

Preferably, the device furthermore comprises a main module, which contains the majority of the functional components of the device, in which the fixed module mainly functions as a holder for the detachable module to be connected thereto, and in which the fixed module is electronically connected to the main module. This makes it possible to mount the main module, which may represent the major part of the value of the device, in a safe, locked place, for example the boot of a car.

Preferably, the detachable module is provided with additional external contact elements, which can be directly connected to the main module by means of an electrical cable. This makes it possible to detach the detachable module, which serves as the operating element, from the fixed module, so that back seat passengers of the car can operate the device, for example, and watch the display screen, for example.

BRIEF DESCRPTION OF THE DRAWINGS

The invention will now be explained in more detail by means of an embodiment as shown in the Figures, in which.

DETAILED DESCRIPTION OF THE PREFERRED EMBODIMENTS

Figure 1:
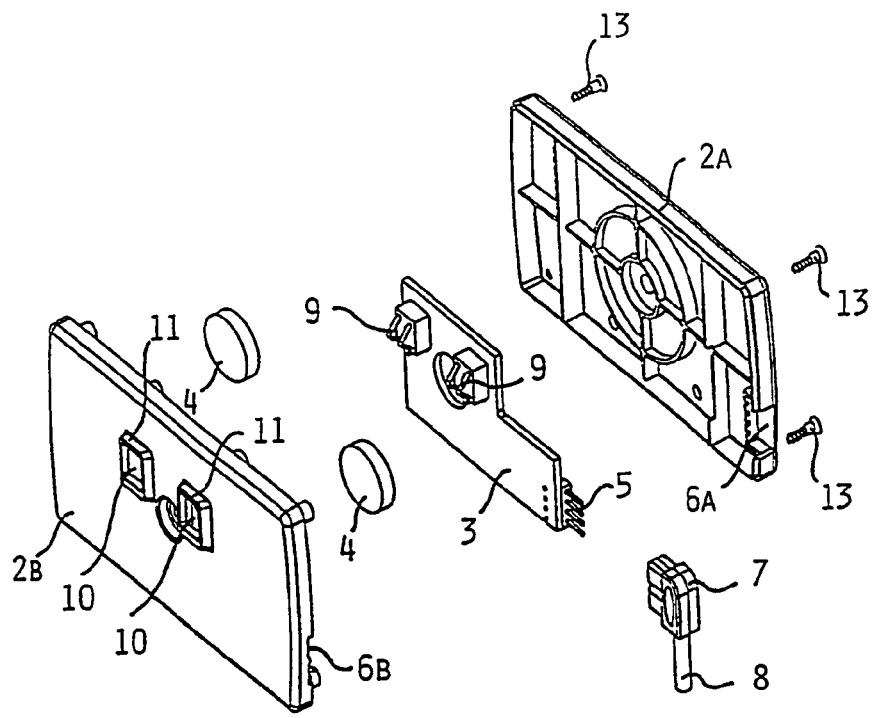
FIG. 1 is an exploded view of the fixed module of a modular electronic device.
Figure 2:
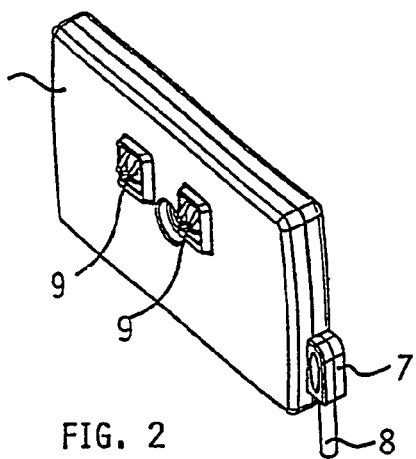
FIG. 2 is a perspective view of the fixed module as shown in FIG. 1.
Figure 3:
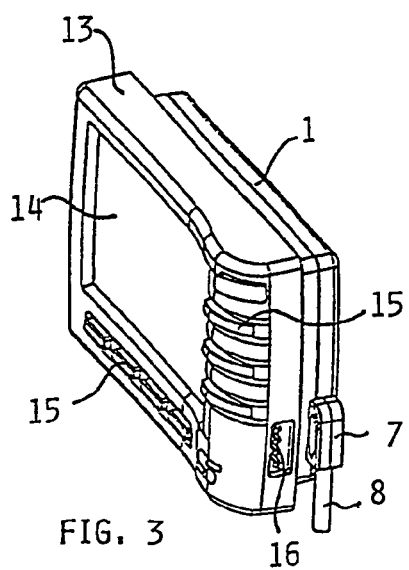
FIG. 3 is a perspective view of the fixed module as shown in FIG. 1 and of a detachable module of the modular electronic device in connected condition.

FIG. 1 shows the individual parts of a fixed module 1 of a modular electronic device, such as a GPS navigation system. The detachable module 1 comprises a housing consisting of a rear housing part 2a and a front housing part 2b, a contact plate 3, and two disc-shaped magnets 4. The contact plate 3 comprises contact fingers 5 on one side, which, in combination with a recess 6a, 6b in the housing, form a contact into which a plug 7 can be inserted. A cable 8 connects the plug 7 to a main module (not shown), in which the other parts of the navigation system are accommodated.

Springing contact elements 9 are mounted on the contact plate 3, which contact elements extend through holes 10 formed in the front housing part 2b for that purpose. Frusto-pyramidal projections 11, i.e. projections 11 whose circumferential walls 12 are pyramidal in part, are arranged on the front side of the housing 1, around the holes 10. Said circumferential walls 12 form guide surfaces which ensure that the detachable module 14 is correctly positioned, to which end the rear wall (not shown) of said detachable module is provided with correspondingly shaped recesses, into which the projections 11 are inserted upon connection of said module. The housing parts 2a, 2b are fixed together by means of screws 13, thereby enclosing the contact plate 3 and the magnets 4.

The rear wall of the detachable module 14 is made of a metal, on which the magnets 4 exert a force of attraction sufficiently large for pulling the detachable module 14 firmly into contact with the fixed module 1. Furthermore, said rear wall is provided with metal contact elements (not shown) in the aforesaid frusto-pyramidal recesses, against which the springing contact elements 9 can abut. The contact elements enable the transfer of data and current between the main module and the detachable module 1, which is furthermore provided with a display screen 15 for displaying information and with inputting keys 16 for operating the navigation device. The detachable module 13 is furthermore provided with an additional contact 16, into which the plug 7 can be inserted. In this way it is possible to disconnect the module 13 from the fixed module 1 and operate the navigation device, for example from the back seat of the car.

The invention claimed is:

1. A modular electronic device, for example a car radio, a navigation system or a radar detection system, said device comprising a fixed module fitted with external electrical contact elements, which is to be mounted with its rear side on a wall, for example a dashboard, and a detachable module fitted with electronic components and external electrical contact elements, wherein the fixed module and the detachable module comprise mating guide surfaces, which guide the detachable module to the correct position upon connection thereof to the fixed module, wherein the detachable module can be connected with its rear wall to a front side of the fixed module in such a manner that the external electrical contact elements of the two modules are interconnected, and wherein one of the front side of the fixed module and the rear wall of the detachable module is provided with at least one magnet and the other one of said front side of the fixed module and rear wall of the detachable module is provided with a metal element, such that the detachable module can be connected to the fixed module through a magnetic force between the magnet and the metal element sufficiently large for pulling the detachable module firmly into contact with the fixed module.

2. The device according to claim 1, wherein the fixed module comprises the magnet, and the detachable module comprises the metal element that can be attracted by the magnet.

3. The device according to claim 1, wherein the detachable module comprises a display screen.

4. The device according to claim 1, wherein the detachable module comprises inputting keys for operating the device.

5. The device according to claim 1, wherein the external electrical contact elements of the fixed module and/or the detachable module are positioned in such a manner that they will automatically come into contact with each other upon connection.

* * * * *